United States Patent [19]
Ehrlich et al.

[11] Patent Number: 5,840,774
[45] Date of Patent: Nov. 24, 1998

[54] LOW DENSITY MICROPOROUS POLYMERS AND PROCESS

[75] Inventors: Paul Ehrlich, Buffalo; Robert Bruce Stewart, Cheektowaga, both of N.Y.

[73] Assignee: Research Foundation of State University of New York, Albany, N.Y.

[21] Appl. No.: 662,263

[22] Filed: Feb. 28, 1991

[51] Int. Cl.$^6$ .................................................. C08J 9/26
[52] U.S. Cl. .................. 521/61; 264/41; 264/65; 264/66; 521/64; 521/97; 521/98; 521/142; 521/143; 521/145; 528/491; 528/497; 528/498; 528/501; 528/502; 528/503
[58] Field of Search ....................... 521/61, 64, 97, 521/98, 142, 143, 145; 528/491, 497, 498, 501, 502, 503; 264/41, 65, 66

[56] References Cited

U.S. PATENT DOCUMENTS

| | | | |
|---|---|---|---|
| 3,812,224 | 5/1974 | Smith et al. | 264/45 |
| 3,870,593 | 3/1975 | Elton et al. | 521/61 |
| 4,061,566 | 12/1977 | Modell | 528/498 |
| 4,146,510 | 3/1979 | Miyanoki et al. | 521/64 |
| 4,524,155 | 6/1985 | Walch et al. | 521/64 |
| 4,598,006 | 7/1986 | Sand | 523/340 |
| 4,734,227 | 3/1988 | Smith | 528/502 |
| 4,946,940 | 8/1990 | Guctes et al. | 528/498 |
| 4,957,943 | 9/1990 | McAllister | 521/64 |
| 5,049,328 | 9/1991 | Meyer et al. | 521/58 |
| 5,066,684 | 11/1991 | LeMay | 521/64 |
| 5,198,471 | 3/1993 | Nauman et al. | 521/48 |
| 5,212,229 | 5/1993 | Taylor et al. | 524/556 |

OTHER PUBLICATIONS

Woodward, A.E.; Atlas of Polymer Morphology; (1988), Chapter 3.

*Primary Examiner*—John M. Cooney, Jr.
*Attorney, Agent, or Firm*—Crossetta & Associates

[57] ABSTRACT

The disclosed invention is a crystalline microporous polymer and process for preparing a low density microporous polymer comprising, providing a mixture of a polymer and a polymer solvent, the mixture capable of achieving a supercritical condition; applying pressure, at a temperature sufficient for the mixture to attain a super critical condition; cooling the supercritical solution that results and precipitating a microporous crystalline polymer product.

20 Claims, No Drawings

LOW DENSITY MICROPOROUS POLYMERS AND PROCESS

The invention described herein was made in the course of work under a grant from the National Science Foundation, particularly NSF grant # CTS-8900122, and the U.S. government has certain rights thereunder.

This invention relates to an improved process for the preparation of porous polymer structures, particularly mechanically self-supporting, microporous, polymer structures containing a continuous, generally crystalline, lamellar network.

BACKGROUND OF THE INVENTION

Numerous commercial applications have been identified for micro-cellular polymeric foams and new methods for the preparation of relatively uniformly microporous polymer structures have taken on increasing importance in the modern world.

Polymer foams are typically manufactured by a wide variety of processes which produce a great range of products. The products of such processes range significantly in density, can be of open or interconnecting cell type, closed or unicellular type and/or combinations of both.

Many methods have been developed for the manufacture of polymer foams. One method of polymer foam production is by dispersion of a gaseous phase to a fluid polymer mass and preserving such state until it sets. Such method typically involves whipping air into the polymer mass and/or heating or reducing pressure on the polymer mass to expand gas bubbles contained therein.

Another method of polymer foam production is to produce gas chemically in the polymer during the reactions that form the polymer. For example in the formation of urethane polymers the reactants can be chosen to produce carbon dioxide which will produce a cellular urethane product. In the formation of phenolformaldehyde foams, steam bubbles can be produced by the exothermic reaction forming the polymer, which can be used to produce a foam. Other examples of the chemical production of gases include the use of blowing agents such as bicarbonates and the like.

Still another method of producing polymer foams is by leaching out solid or liquid dispersed materials in the polymer or the like processing. One such method, useful for forming low density micro-cellular polystyrene foams, is disclosed by J. H. Aubert and R. L. Clough in Polymer 26, 2047 (1985). Therein a phase-separation process to produce polystyrene foam is disclosed wherein polystyrene is dissolved in cyclohexane and the resulting solution is placed in a mold with the mold being cooled until the cyclohexane is frozen. The solvent is then freeze dried, leaving behind the polymer as a foam, which is reported to be opened celled, dimensionally stable at room temperature and capable of being handled or even machined. The morphology of the foam structure is said to be isotropic and of a small cell size (e.g., about 10 $\mu$m) if there is liquid-liquid phase separation between the fluid polystyrene and the fluid cyclohexane before the point of freezing is reached, or anisotropic and of larger cell size (e.g., about 100 $\mu$m) if liquid-solid phase separation occurs. Control of the morphology is said to be by careful selection of the polymer solvent phase separation point relative to the polymer separation point.

An object of the present invention is to provide a process for the formation of low density polymer structures.

Another object of the present invention is to provide a low density polymer product having generally uniform microporous structure.

A still further object of the present invention is to provide a low density polymer structure comprising a generally open celled, crystalline lamellar cell network.

These and other objects of the invention will become apparent from the following description of the invention.

SUMMARY OF THE INVENTION

The present invention relates to a process for preparing a low density microporous polymer comprising, providing a mixture comprising a crystalline polymer and a polymer solvent, said mixture capable of achieving a supercritical condition; applying pressure, at a temperature sufficient for said mixture to attain a supercritical condition; cooling the resulting supercritical solution and precipitating a porous crystalline polymer product.

The method of the invention has been found effective in producing polymer structures having a generally uniform microporosity and comprising an open cell, generally crystalline, lamellar network. The invention includes the process as it may stand alone as a microporous polymer forming process, as well as it may include microporous polymer structures formed therefrom.

DETAILED DESCRIPTION OF THE INVENTION

As used in this invention the term supercritical condition includes "near supercritical", that is those conditions of temperature and pressure which are at, or approach, the supercritical state of the mixture. The supercritical state is generally considered to be that state of the mixture wherein under elevated pressure and temperature the mixture behaves generally as a single phase and is typically termed a supercritical fluid or solution. Such state is typically attained at or above the critical temperature of the solvent, although this is not a requirement, at a pressure that is considerably higher than the critical pressure of the solvent. The pressure required to attain the supercritical condition is known as the cloud-point pressure. Near supercritical condition is a condition existing somewhat below the cloud-point pressure wherein there is a separation into liquid and gas phases, the compositions of which vary somewhat from the overall composition of the mixture. The liquid phase of such a mixture generally contains at least 50% by weight solvent.

A variety of solvents and/or solvent mixtures may be used in the process of the invention that are capable of solubilizing the polymers, copolymers or mixtures thereof of the invention and attain a supercritical condition thus forming a supercritical fluid or solution. Typical solvents useful in the invention include the lower alkanes such as ethane, propane, butane, pentane and the like; the lower alkenes such as ethylene, propylene, butylene and the like; lower halocarbons such as dichlorodifluoromethane, methylene chloride, tetrafluoroethane and the like; and carbon dioxide and the like. Advantageously, the critical temperature of the solvent is not so high that during subjugation to the processing of the invention the polymers, copolymers or mixtures thereof will be deleteriously effected, such as by decomposition and the like. Typically also the critical temperature of the solvent should be below the melting temperature of the polymers, copolymers or mixtures thereof, but such is not required. Generally it is preferred that the solvent have a critical temperature from about 5° to about 250° Centigrade.

Generally, a broad range of crystalline polymers and copolymers for which a suitable solvent can be found that forms a supercritical or near supercritical fluid or solution in accord with the invention are operable in the process of the invention. Preferred crystalline polymers include the olefinic polymers and copolymers therewith, while the particularly preferred polymers include those formed from polyethylene, polypropylene, including isotactic polypropylene, poly (butene-1) and poly(4-methylpentene-1). Similarly, a broad range of copolymers are operable in the process of the invention, including various crystalline copolymers formed by the aforesaid polymers with for example vinyl acetate, vinyl chloride, vinyl fluoride, acrylic acid, chlorotrifluoroethylene and the like.

In the process of the invention, typically a solid crystalline polymer or copolymer is mixed with an appropriate liquid and/or gaseous solvent to provide the desired mixture. The mixture is generally confined within a pressure vessel and subjected to sufficient pressure, at such temperature that the mixture becomes a supercritical or near supercritical fluid or solution. At such condition, the supercritical fluid comprises a solution of the polymer or copolymer with the solvent that fills the volume of the vessel in which it is confined in generally homogeneous distribution. In the near supercritical state, distribution is less homogeneous because modest differences between the liquid and gas phase compositions exist. As the confined supercritical solution is cooled, a generally homogeneous distribution of crystallites is formed and maintained for further nucleation and crystalline growth during the course of the polymer crystallization. As the polymer undergoes further crystallization during the cooling process, a mechanically stable network is formed.

Removal and/or recovery of the solvent is typically achieved by controlled venting of the solvent from the pressure vessel after initial formation of the crystalline network and during further cooling. Generally it is preferred to vent the solvent while it is in its gaseous condition so as to preclude breakup of the polymer network from evaporation of a liquid.

The rate of cooling appears to have an effect upon the morphology of the resulting product as well as does the viscosity and relative concentration of polymer or copolymer. In general, if the solution is slowly cooled a more organized morphology results than when it is rapidly cooled. Thus, it has been found that when a supercritical solution is slowly cooled the network of crystals will appear as a collection of lamellar stacks that have coarse structures reminiscent of spherulites. When rapidly cooled the lamellae appear to be finer in structure and do not exhibit an approach to spherical symmetry.

Typically the crystals formed by the process of the invention are an open cell gel configuration consisting of a continuous network of polymer suspended in an open space. The network possesses some of the topological features of aerosols and of low density open cell foams, with however the solute particles being connected. In open celled foams the polymeric solute is normally concentrated in quasi, two dimensional, membrane-like structures, whereas in the present invention, lamellar structure resembling that which can sometimes be obtained by crystallization from conventional liquid solvents has been found. The network has a density dependent upon the concentration of polymer to solvent. Generally it is preferred to provide a mixture comprising from about 2 to about 50% by weight of polymer which produces a network having a density from about 0.020 to about 0.35 g/cm$^3$.

The mechanical properties of the structures formed depend upon the concentration of polymer to solvent and the molecular weight of the polymer being used. Thus, when a low molecular weight polymer is used in low concentration, the resulting network is fragile, barely able to support its own weight and can be easily crumbled to a powder. When a high molecular weight polymer is used in higher concentrations, a relatively strong solid can be formed having relatively high compressive strength.

The crystalline products of the invention appear to have multiple diverse utilities. The low density products are suitable as efficient thermal transfer barriers, or, particularly because of their open celled arrangement, may be utilized as substrates on which can be deposited other materials such as catalysts and the like. The structures may be suitable for filters or as matrixes for polymer composites. They may be used in forming laminates or the like. They may be starting materials for the formation of high strength films or fibers formed through ultra drawing. One embodiment of the product is as a substrate for the deposition of a surface active catalyst that maximizes the catalytic surface area available in a chemical reaction. Another embodiment involves the in-situ deposition of the microporous polymer or copolymer on another structure exposed to the supercritical, or near supercritical, solution, for example a wafer, microchip or other electronic device.

The following examples are provided to illustrate the invention and should not be construed as limiting in its scope. All parts and percentages are by weight unless otherwise indicated.

GENERAL PROCEDURE

In each of the following examples, a selected polymer was added to a cylindrical pressure vessel, having an internal length of about 16.25 cm and an internal diameter of about 1.9 cm. The interior of the vessel is accessible by a removable window arranged at one end of the vessel, through which the vessel can be loaded and contents thereof observed. The vessel comprises a movable piston at the other end. Once the vessel is sealed, inward and outward adjustment of the piston allows variation of the confining volume and accordingly variation of the pressure within the confining volume of the vessel. When the contents of the vessel are to be agitated, a spin bar is placed in with the mixture and is activated by an external magnet. The vessel is mounted in an air oven arranged so that the temperature of the vessel and its contents can be controlled.

The polymer is added to the vessel as a solid, in the form of pellets, or as a powder, and the solvent is typically added as a known volume of liquid, typically under its own vapor pressure. The resulting mixture is compressed by moving the piston in the vessel to reduce the volume containing the mixture. The volume containing the mixture is typically compressed to an initial starting pressure, typically about 3,000 psi for a polyethylene-propane mixture, such that upon heating the vessel to a desired temperature the mixture will approach the desired final pressure. Upon reaching the desired temperature the pressure is adjusted to that sufficient to form a uniform supercritical solution, typically at a single supercritical phase. After formation of the single supercritical phase, the vessel is cooled to form the crystalline gels of the invention.

EXAMPLE 1

Using the above-identified apparatus and procedure, 20 cm$^3$ (10.01 g) of propane was metered into a pressure vessel into which 2.82 g of a commercial, high density, pelletized polyethylene had been placed. The vessel was initially pressurized by adjusting the position of the piston and then heated to a temperature of about 125° C. The pressure in the vessel was then increased to about 6,700 psi by adjusting the position of the piston and the contents thereof were agitated by a spin bar. A uniform supercritical solution of polyethylene in propane was observed to be formed. The vessel was then slowly cooled to about 100° C. by circulating ambient air through the oven. The pressure in the vessel was maintained above 6,500 psi throughout cooling.

Polymer crystallization was evident by the darkness of the vessel's contents and was observed to take place over the temperature range of about 110° C. to 100° C. After crystallization has been completed, the vessel was cooled to near room temperature and the propane was allowed to vent slowly from the vessel through an exhaust valve until the pressure within the vessel approached atmospheric. Upon opening the pressure vessel a porous, solid polyethylene plug was recovered that filled the confining volume of the vessel. The bulk density of the plug, when determined by comparing the amount of polyethylene added to the vessel to the internal volume of the vessel occupied by the crystallized structure, will be found to be less than about 0.30 gm/cm$^3$.

EXAMPLE 2

Following the procedures of Example 1, a solution containing 20 cm$^3$ of propane and 2.82 g of pelletized high density polyethylene was prepared in the pressure vessel apparatus, heated to a temperature of 125° C. and pressurized to about 6,700 psi by reducing the confining volume of the mixture within the vessel. The pressure was then dropped to 6,150 psi by increasing the volume. At that point it was observed that the supercritical solution separated into a liquid and a gas phase, both of which appeared to contain significant, though different, concentrations of polymer relative to solvent. Since a pressure of about 6,400 psi is typically considered as required to form a supercritical phase of the mixture, the condition attained at 6,150 psi was considered as a near-supercritical condition. The system was cooled to 100° C., while maintaining the internal pressure of the vessel between about 6,000 and about 6,150 psi. The vessel was thereafter cooled to room temperature and vented of solvent by the procedure of Example 1 resulting in the recovery of a cylindrical plug of polyethylene that was of somewhat non-uniform strength and porosity.

EXAMPLE 3

Following the procedure of Example 1, a 2.05 g sample of a granular low density polyethylene was mixed, in the pressure vessel apparatus, together with 10.20 g of propane. The mixture was heated and pressurized, with a supercritical solution being formed at 125° C. and about 8,050 psi. The solution was slowly cooled to 90° C., while the pressure was maintained above 7,000 psi. After cooling to room temperature, venting of solvent and equalizing pressure, a uniform, porous plug of polyethylene was recovered. The bulk density of the plug, when determined by comparing the amount of polyethylene added to the vessel to the internal volume of the vessel occupied by the crystallized structure, will be found to be less than about 0.20 gm/cm$^3$.

EXAMPLE 4

Following the procedure of Example 1, a 0.64 g sample of a narrow fraction of linear polyethylene, having a molecular weight of about 110,000, was mixed with 10.76 g of propane in the pressure vessel apparatus. Heat and pressure were imposed upon the mixture and a supercritical solution formed at about 125° C. and about 9,600 psi. The pressure in the vessel was maintained and the mixture was slowly cooled to about 100° C. After cooling to room temperature, venting of solvent and equalizing pressure, a uniform, porous plug of polyethylene was recovered.

EXAMPLE 5

Following the procedure of Example 1, a 1.77 g sample of isotactic polypropylene was mixed with 10.01 g of propane in the pressure vessel apparatus. The vessel was heated and pressurized and a supercritical solution formed at about 130° C. and about 4,250 psi. The solution was allowed to slowly cool to 90° C. while maintaining the pressure at above about 4,200 psi. After cooling to room temperature, venting and equalizing pressure, a uniform, porous plug of polypropylene was recovered. The bulk density of the plug, when determined by comparing the amount of polypropylene added to the vessel to the internal volume of the vessel occupied by the crystallized structure, will be found to be less than about 0.15 gm/cm$^3$.

EXAMPLE 6

Following the procedure of Example 1, a 1.07 g sample of high density polyethylene was mixed with 12.02 g of n-butane in the pressure vessel apparatus. The vessel was heated and pressurized and a supercritical solution of the contents was formed at about 130° C. and about 3,950 psi. The solution was cooled to about 90° C. while maintaining the pressure above about 3,900 psi. After cooling to room temperature, venting and equalizing pressure, a uniform, porous plug of polyethylene was recovered.

I claim:

1. A process for preparing a low density microporous polymer comprising, providing a mixture comprising a crystalline polymer and a polymer solvent, said mixture capable of achieving a supercritical condition; forming a supercritical solution from said mixture by applying pressure at a temperature sufficient for said mixture to attain a supercritical condition; cooling the supercritical solution at a rate sufficient to precipitate a porous crystalline polymer product.

2. The process of claim 1 wherein said mixture comprises from about 2 to about 50 weight percent polymer.

3. The process of claim 1 wherein said mixture comprises a solvent in a gaseous state and a polymer in a solid state.

4. The process of claim 1 wherein heat is applied to attain said supercritical condition.

5. The process of claim 1 wherein said polymer comprises an olefin polymer.

6. The process of claim 5 wherein said polymer is selected from the group consisting of polyethylene, polypropylene and polybutylene.

7. The process of claim 6 wherein said polymer is selected from the group consisting of linear polyethylene, branched polyethylene, poly-4 methylpentene-1 and isotactic polypropylene.

8. The process of claim 1 wherein said mixture comprises a copolymer.

9. The process of claim 8 wherein said copolymer is formed from an olefin and one of the group consisting of vinyl acetate, vinyl chloride, vinyl fluoride, chlorotrifluoroethylene and acrylic acid.

10. The process of claim 1 wherein said solvent has a critical temperature from about 5° to about 250° Centigrade.

11. The process of claim 10 wherein said solvent comprises one of the group consisting of carbon dioxide, lower alkane, lower alkene and lower halocarbon.

12. The process of claim 11 wherein said solvent comprises a lower alkane.

13. The process of claim 12 wherein said solvent is selected from the group consisting of propane and butane.

14. The process of claim 1 wherein said pressure is removed after precipitating said porous crystalline polymer product.

15. A low density microporous polymer produced from a process comprising, providing a mixture comprising a crystalline polymer and a polymer solvent, said mixture capable of achieving a supercritical condition; forming a supercritical solution from said mixture by applying pressure at a temperature sufficient for said mixture to attain a supercritical condition; cooling the supercritical solution at a rate sufficient to precipitate a porous crystalline polymer product having a network of crystals in an open cell gel configuration, which appear as a collection of lamellar stacks.

16. The product of claim 15 wherein said polymer is selected from the group consisting of substituted and unsubstituted polyethylene, polypropylene and polybutylene.

17. The product of claim 16 wherein said polymer is selected from the group consisting of linear polyethylene, branched polyethylene and isotactic polypropylene.

18. The product of claim 15 wherein said mixture comprises a copolymer.

19. The product of claim 18 wherein said copolymer is formed from an olefin and one of the group consisting of vinyl acetate, vinyl chloride, vinyl fluoride, chlorotrifluoroethylene and acrylic acid.

20. The product of claim 15 wherein said solvent comprises one of the group consisting of carbon dioxide, lower alkane, lower alkene and lower halocarbon.

* * * * *